Figure 1:
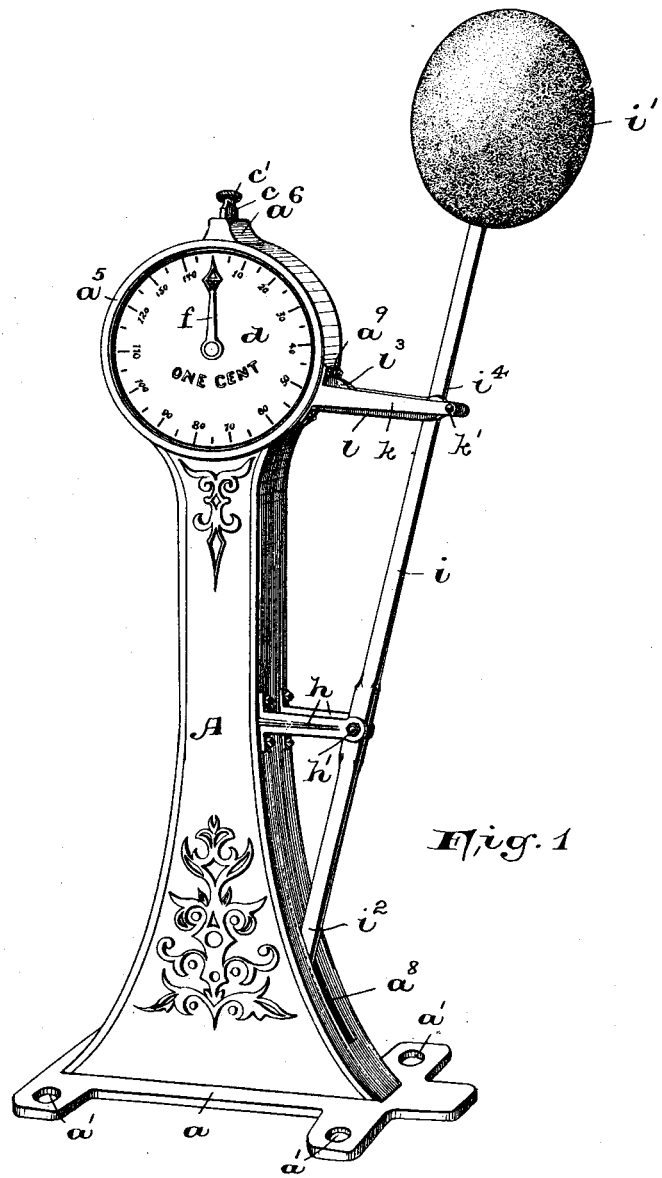

(No Model.) 3 Sheets—Sheet 1.

G. TROXLER, Jr.
COIN CONTROLLED STRIKING AND TESTING MACHINE.

No. 546,392. Patented Sept. 17, 1895.

WITNESSES:
Marcy J. Drusdell.
Wm. H. Canfield, Jr.

INVENTOR:
Gustavus Troxler, Jr.
BY
Fred C. Fraentzel,
ATTORNEY

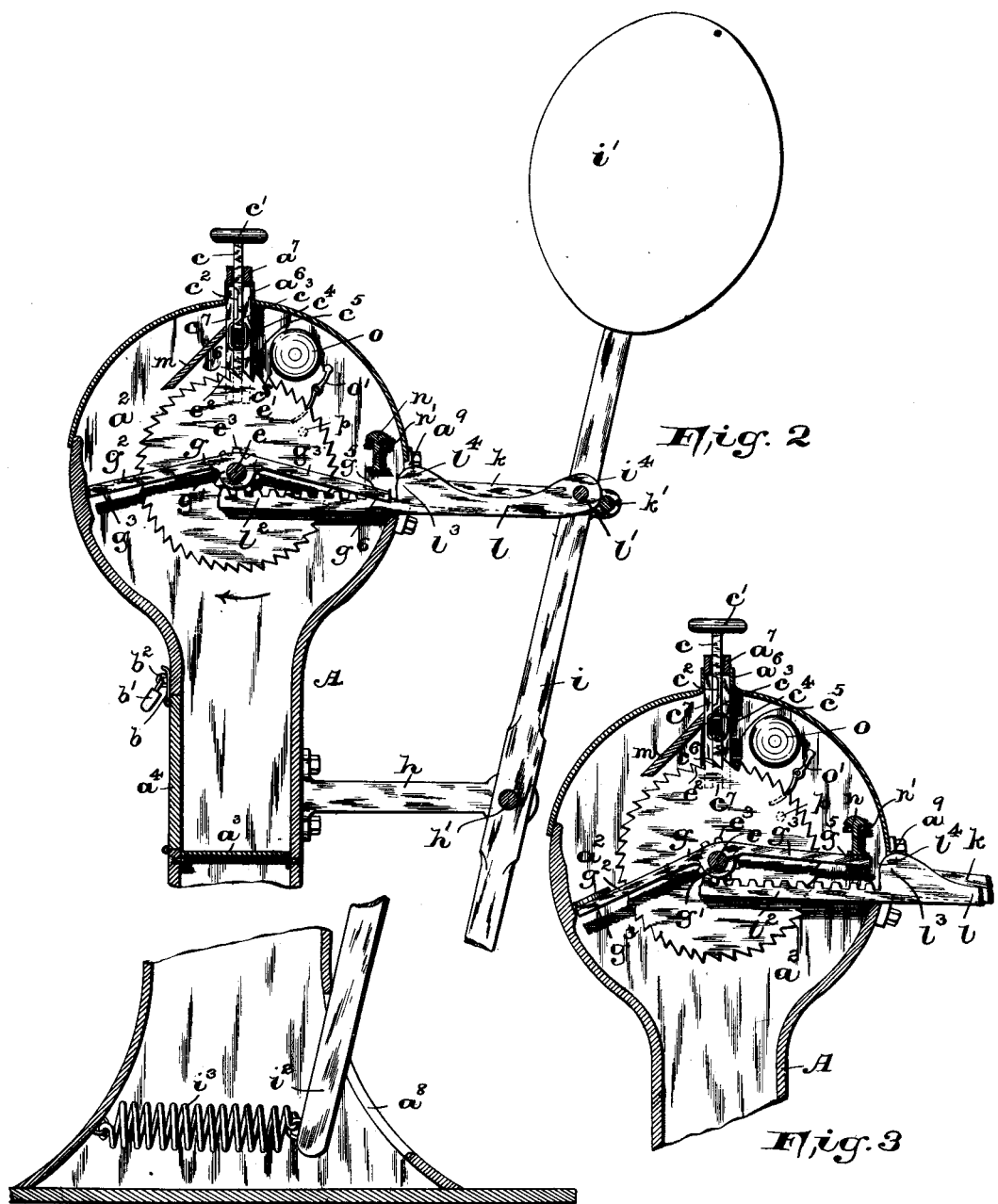

(No Model.) 3 Sheets—Sheet 3.
G. TROXLER, Jr.
COIN CONTROLLED STRIKING AND TESTING MACHINE.
No. 546,392. Patented Sept. 17, 1895.
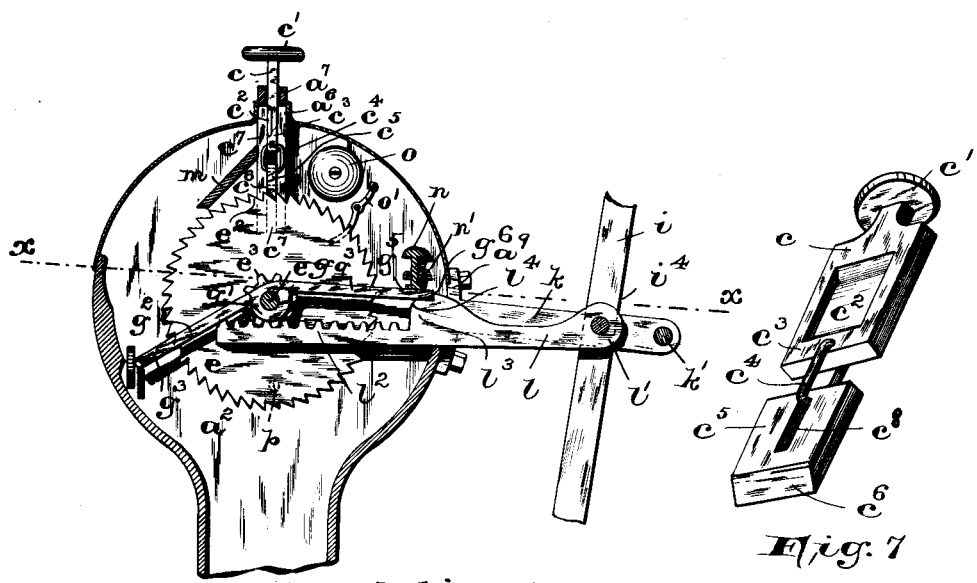
Fig. 4.
Fig. 7.
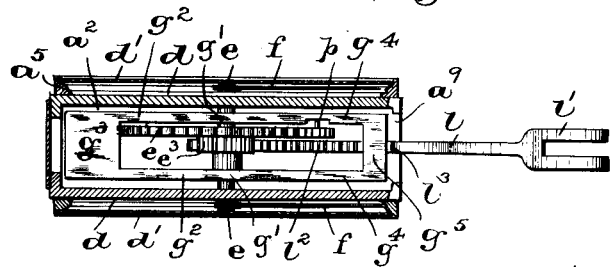
Fig. 5.
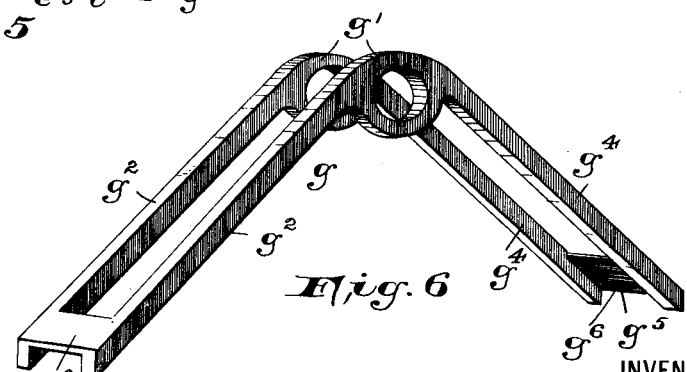
Fig. 6.
WITNESSES: INVENTOR:
Gustavus Troxler, Jr.
BY
Fred'k Fraentzel,
ATTORNEY

UNITED STATES PATENT OFFICE.

GUSTAVUS TROXLER, JR., OF NEWARK, NEW JERSEY, ASSIGNOR TO THE CHAMPION PUNCHING MACHINE COMPANY, OF SAME PLACE.

COIN-CONTROLLED STRIKING AND TESTING MACHINE.

SPECIFICATION forming part of Letters Patent No. 546,392, dated September 17, 1895.

Application filed January 22, 1895. Serial No. 535,768. (No model.)

*To all whom it may concern:*

Be it known that I, GUSTAVUS TROXLER, Jr., a citizen of the United States, residing at Newark, in the county of Essex and State of New Jersey, have invented certain new and useful Improvements in Coin-Controlled Striking and Strength-Testing Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention has reference to improvements in coin-controlled striking and strength-testing machines, and has for its main purpose to provide a machine of this class which shall be of a simple and effectual construction and shall be of great utility in registering and testing the force of a blow from the arm of a person.

A further object of this invention is to provide means for sounding a gong to indicate that the mechanism of the apparatus has been operated to its full limit when the punching bag or ball connected with the machine has been struck with the maximum force of a blow.

The invention consists, essentially, in the arrangement of a coin-controlled mechanism, a spring-actuated arm having a punching bag or ball on the end thereof, and means connecting said arm with the registering mechanism within the machine-casing to operate the same when the ball or bag is struck, and thereby register the force of the blow.

The invention further consists in the details of the construction and arrangements of parts, such as will be hereinafter fully described, and finally embodied in the clauses of the claim.

One of the main features of my invention is the simplicity of construction, which renders the apparatus inexpensive of manufacture, and the fact that when a person strikes the punching bag or ball a heavy blow and slips off he cannot injure his hand by coming in contact with the casing of the machine.

In the drawings herewith accompanying, in which like letters of reference are employed in the several views to indicate corresponding parts, Figure 1 is a perspective view of my novel form of coin-controlled striking and strength-testing apparatus. Fig. 2 is longitudinal vertical section of the apparatus, clearly illustrating the inner mechanism in its initial position before being operated by a coin; and Fig. 3 is a like view of the upper portion of the casing of the apparatus, illustrating the relative position of the coin-controlled mechanism when a coin has been dropped into the apparatus, the mechanism thereby being brought into a position that the registering devices can be operated when the punching bag or ball is struck. Fig. 4 is a similar view of the said parts, illustrating the registering devices just about being operated by the arm or rod with which the punching bag or ball is connected; and Fig. 5 is a horizontal section of the machine, taken on line $x$ in said Fig. 4, with the said arm or rod and its punching bag or ball omitted from said view. Fig. 6 is a perspective view of a coin-operated saddle or releasing device used in connection with the operating mechanism of the machine, and Fig. 7 is a similar view of a combined coin-holder and lock-arm for depositing the coin into the machine and holding or locking the registering device in its operated position when the ball or bag has been struck.

In said drawings, A designates a suitable case or inclosure of wood or metal, made in one piece or of several parts, which can be secured together in any well-known manner. The casing A is provided with a suitable base $a$, having holes or perforations $a'$ therein for bolts or screws, whereby the apparatus can be securely fastened to the floor. The upper part of said case or inclosure is suitably enlarged, forming a chamber $a^2$, in which is arranged the operating mechanism of the machine. Within said casing A, at a point below said chamber $a^2$, I have arranged a partition $a^3$, on which may be placed a money-receptacle, (not shown in the drawings,) and $a^4$ is a door, hinged or otherwise secured to said case A just above said partition, as will be seen from Fig. 2. Said door is provided with a hasp $b$, which can be placed over a staple $b^2$ on the case A and securely locked by means of a lock $b'$, but any other suitable locking means may be employed, if desired.

The upper and enlarged portion of the case A is provided on one or both of its opposite sides with a suitable frame $a^5$, in which I arrange a dial or dials $d$, which may be covered by a glass-pane $d'$, as will be evident. The said frame $a^5$ may be formed integral with the side of the upper portion of the case A, or it may be separate therefrom, and can be secured to the side or sides of the apparatus in any well-known manner, as will be clearly understood. The upper portion of said case or inclosure is provided with a raised portion $a^6$, having a slotted block $a^7$ therein, in which is a sliding coin-holder $c$, as illustrated in Figs. 2, 3, and 4. Said coin-holder $c$ is provided with a suitable finger-piece $c'$ and has a coin-recess $c^2$ in the one side thereof. Connected with the lower part $c^3$ of said holder $c$, by means of a link $c^4$ or in any other well-known manner, is a lock-plate $c^5$, the lower end of which is chamfered, as at $c^6$, and is normally in holding engagement with one of the sprockets $e^2$ on the wheel $e'$, substantially as shown in said Figs. 2, 3, and 4. Said sprocket or toothed wheel $e'$ is secured on a rod or axle $e$, rotatively arranged in bearings in the opposite sides of the case A, through which the ends of said rod $e$ project and are provided with index-hands $f$, as shown in Figs. 1 and 5. On said rod or axle $e$, I have also secured a pinion $e^3$, and pivotally supported upon said rod or axle is what I term a "saddle," to be tilted when a coin is deposited on one end thereof, thereby bringing the other parts of the mechanism in the machine into their relative operative positions. The construction of said saddle $g$ is clearly illustrated in Fig. 6, being provided with pivotal supports $g'$, by means of which the said saddle can be placed on the rod or axle $e$ and is perfectly balanced thereon, as will be seen from Fig. 2. Downwardly-projecting arms $g^2$, connected by means of a cross-piece $g^3$, extend from one side of said pivotal supports $g'$, while similarly-arranged arms $g^4$, having a connecting cross-piece $g^5$ at their lower ends, extend from the opposite side of the said bearings $g'$, as shown.

As will be seen from Figs. 1 and 2, I have secured to one side of the case or inclosure A a bracket $h$, and on a pivotal pin $h'$ in the free end of said bracket I arrange a rod or arm $i$, provided at the top with a punching bag or ball $i'$. The lower end $i^2$ of said arm or rod passes through a slot or opening $a^8$ in the side near the bottom of the case A, and is connected to said casing, within the same, by a suitable spring $i^3$. When the said arm or rod $i$ is in its normal and inoperative position, said spring $i^3$ forces the edge $i^4$ of the rod against a pin $k'$ between two guide-arms $k$, which extend from the side of the case, substantially as shown. Said pin $k'$ acts as a stop, and the pivotally-arranged rod or arm $i$ is capable of a reciprocatory movement between said guide-arms $k$, as will be clearly understood from an inspection of the several figures of the drawings. An arm $l$, provided with a forked end $l'$, is pivotally connected with said arm or rod $i$, said arm $l$ extending into and being capable of a sliding movement back and forth in an opening $a^9$ in the enlarged portion of the apparatus. The free end of said slide $l$ is provided with teeth $l^2$ in the manner of a rack, which is in operative engagement with the pinion $e^3$ on the rod or axle $e$. The said slide $l$ is further provided with a shoulder $l^3$, which forms a stop, and against which the plate or cross-piece $g^5$ on the arms $g^4$ of the saddle is in locked or holding engagement when all the parts of the apparatus are in their normal and inoperative positions. As will be more especially seen from Fig. 5, said arms $g^2$ $g^2$ and $g^4$ $g^4$ are arranged on opposite sides of the sprocket-wheel $e'$ and its pinion $e^3$; but they may be differently arranged if desired.

The apparatus is operated in the following manner: By means of the finger-piece $c'$ a person raises the coin-holder $c$, so as to bring the coin-receiving recess $c^2$ above the upper surface of the block $a^7$, the link $c^4$ in coming in contact with the under surface of the said block preventing said holder from being pulled entirely out of place, while at the same time said lock-plate $c^5$ slides in suitable guides or ways $c^7$ on the inner sides of the said casing, as clearly indicated in Figs. 2, 3, and 4. When a coin has been placed in said recess $c^2$ in the raised coin-holder $c$, the latter is allowed to drop back into its former position in the machine, thereby bringing the coin below said block $a^7$. The coin then drops on an inclined plate or chute $m$, and is finally deposited on the plate or cross-piece $g^3$ of the saddle $g$. The weight of the coin causes the lowering of the one end of the saddle and raises the other end thereof, bringing said raised end against a weight $n$, arranged to slide in ways or guides $n'$, and the saddle is held in the position indicated in Fig. 3. The punching bag or ball is now ready to be punched, the mechanism within the machine having thus been brought into position to be operated. When the bag or ball is struck, the rounded portion $l^4$ on the shoulder $l^3$ of the slide $l$ is forcibly brought in sliding contact with the edge $g^6$ of the plate $g^5$, as clearly indicated in Fig. 4, thereby still farther raising the arms $g^4$ of the saddle, and also the weight $n$, while the coin on the plate $g^3$, connecting the arms $g^2$ of the saddle, is dropped down into the money-receptacle on the partition $a^3$. During this operation the rack $l^2$ is forced inwardly, operates the rod or axle $e$ by means of the pinion $e^3$ secured thereon, and causes the toothed wheel $e'$ to rotate in the direction of the arrow in said Fig. 2, and the index-hands $f$ will register the result of the force of the blow on the dial or dials $d$, as will be understood. While said wheel $e'$ is moving in the direction of the said arrow, the chamfered edge of the lock-plate $c^5$ will, owing to the construction of the teeth $e^2$ on said wheel $e'$, pass over said teeth; but when the momentum of said wheel ceases, then said lock-plate $c^5$ will hold said wheel, and hence the axle $e$ and its index-hands in operative positions while registering the force of the blow. Owing to the arrangement of the link $c^4$, connecting the coin-holder $c$ with said plate $c^5$ and being movably arranged in a slot $c^8$ in said plate $c^5$, the latter can rapidly move up and down over the teeth of the revolving wheel $e'$ without affecting the stationary position of the part $c$.

To return the several parts of the mechanism to their normal and inoperative positions, and to bring the index-hands back to zero on the dials, the plate $c$ is raised, thereby causing the disengagement of said plate $c^5$ from its holding contact with the toothed wheel $e'$, and the compressed spring connected with the lower end of the bar or arm $i$ will be the cause of the several parts of the mechanism returning to their normal positions. (Indicated in Fig. 2.) At the same time the weight $n$ will force the end $g^5$ of the saddle $g$ back into its holding engagement with the shoulder or stop on the slide $l$, and the apparatus is in condition to receive another coin previous to the punching bag or ball being struck. Instead of making the said coin-holder $c$ and the lock-plate connected therewith in two pieces, they may be formed integral with each other, as will be clearly evident.

When the registering mechanism of the apparatus has been operated by the maximum force of a blow, causing the index-hands to make a complete revolution on the dials, this fact is indicated by the sounding of a gong $o$. As will be seen from Figs. 2, 3, and 4, I have arranged on the side of the wheel $e'$ a pin or projection $p$, which comes in contact with the usual form of striker $o'$ of the gong and rings the latter, as will be understood.

From the above description it will be seen that I have devised a simple and effectively working striking and strength-testing machine, by means of which the force of a blow from the arm of a person is accurately registered and indicated on the dial or dials connected with the machine.

Of course it will be understood that the arrangement and construction of the various parts of the apparatus may be changed without departing from the scope of my present invention, and hence I do not wish to be understood as limiting myself to the exact arrangement of the parts herein shown and described.

Having thus described my invention, what I claim is—

1. In a striking machine, in combination, an arm or rod pivotally arranged in a bearing on the casing of the machine, a punching bag or ball on said rod, and mechanism adapted to be operated by the movement of said arm or rod, to register the force of a blow, comprising therein, a ratchet wheel mounted on an axle, a rack and pinion, and a coin-operated saddle pivotally supported on said axle, and means connected with said pivoted arm or rod, co-operating with said saddle, to force the coin therefrom when the parts are operated, substantially as and for the purposes set forth.

2. In a striking machine, in combination, an arm or rod pivotally arranged in a bearing on the casing of the machine, and a punching bag or ball on said rod, a coin chute in said casing, comprising therein an opening in the top of the casing, a recessed coin holder movably arranged in said opening, a rod or axle in said casing, a coin-operated saddle mounted thereon, a ratchet wheel on said rod or axle, an index hand on one or both ends of said axle, and means, connected with said rod or arm having the ball thereon, co-operating with said saddle to still farther tilt the same, and for operating the registering mechanism in the casing, substantially as and for the purposes set forth.

3. In a striking machine, in combination, an arm or rod pivotally arranged in a bearing on the casing of the machine, and a punching bag or ball on said rod, a coin chute in said casing, comprising therein an opening in the top of the casing, a recessed coin holder movably arranged in said opening, a rod or axle in said casing, a coin-operated saddle mounted thereon, a ratchet wheel on said rod or axle, an index hand on one or both ends of said axle, and means, connected with said rod or arm having the ball thereon, consisting essentially, of a rack pivotally attached to said rod or arm, and a pinion on the axle in the casing of the machine, with which said rack is in operative engagement, and a stop on said rack normally in holding engagement with said saddle, but co-operating therewith to still farther tilt the same, when said saddle is partially raised by the weight of a coin, substantially as and for the purposes set forth.

4. In a striking machine, the combination, with the registering mechanism and a coin chute, of a saddle $g$ adapted to be partially tilted by the weight of a coin, and a pivoted arm $l$ having a stop thereon, said arm being adapted to be operated to still farther tilt said saddle, substantially as and for the purposes set forth.

5. In a striking machine, the combination, with the registering mechanism and a coin chute, of a saddle $g$ adapted to be partially tilted by the weight of a coin, a weight, $n$, arranged to slide in guides $n'$ in the casing of the machine, and an arm $l$ having a stop thereon, said arm being adapted to be operated to still farther tilt said saddle, substantially as and for the purposes set forth.

6. In a striking machine, in combination, with the registering mechanism, comprising therein, a rod or axle $e$, a ratchet wheel and pinion thereon, and an index hand on one or both ends of said rod $e$, a coin chute, a saddle $g$ adapted to be partially tilted by the weight of a coin, and a pivoted arm $l$ having a stop $l^3$ thereon and a rack $l^2$ engaging with said pinion on the rod $e$, and means for operating said arm $l$ to still farther tilt said saddle and operate the registering mechanism, substantially as and for the purposes set forth.

7. In a striking machine, in combination, with the registering mechanism, and a coin chute, of a coin holder, $c$, adapted to slide up and down in said chute, and means on said coin holder adapted to lock with the registering mechanism, and means for operating the same, substantially as and for the purposes set forth.

8. In a striking machine, in combination, with the registering mechanism, and a coin chute, of a coin holder, $c$, adapted to slide up and down in said chute, consisting essentially, of a recessed plate $c^2$, and a lock-plate $c^5$ movably connected with said plate $c^2$, adapted to lock with the registering mechanism, and means for operating the same, substantially as and for the purposes set forth.

9. In a striking machine, in combination, with the registering mechanism, and a coin chute, of a coin holder, $c$, adapted to slide up and down in said chute, consisting essentially, of a recessed plate $c^2$, and a lock-plate $c^5$ movably connected with said plate $c^2$, adapted to lock with the registering mechanism, and means for operating the same, comprising therein, a pivoted arm $i$ having a ball or punching bag thereon, an arm $l$ pivotally connected with said arm or rod $i$, a rack $l^2$ on said arm $l$, a pinion in engagement with said rack, adapted to operate the registering mechanism, and a saddle $g$ adapted to be partially tilted by the weight of a coin, and said arm $l$ co-operating therewith to still farther tilt said saddle, substantially as and for the purposes set forth.

In testimony that I claim the invention set forth above I have hereunto set my hand this 18th day of January, 1895.

GUSTAVUS TROXLER, JR.

Witnesses:
FREDK. C. FRAENTZEL,
WM. H. CAMFIELD, Jr.